(12) United States Patent
Tonogai et al.

(10) Patent No.: US 11,667,036 B2
(45) Date of Patent: Jun. 6, 2023

(54) WORKPIECE PICKING DEVICE AND WORKPIECE PICKING METHOD

(71) Applicant: OMRON Corporation, Kyoto (JP)

(72) Inventors: Norikazu Tonogai, Nara (JP); Toshihiro Moriya, Tokyo (JP); Takeshi Kojima, Kyoto (JP); Haruka Fujii, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 498 days.

(21) Appl. No.: 16/968,165

(22) PCT Filed: Mar. 11, 2019

(86) PCT No.: PCT/JP2019/009593
§ 371 (c)(1),
(2) Date: Aug. 7, 2020

(87) PCT Pub. No.: WO2019/176829
PCT Pub. Date: Sep. 19, 2019

(65) Prior Publication Data
US 2021/0039257 A1    Feb. 11, 2021

(30) Foreign Application Priority Data

Mar. 13, 2018    (JP) .............................. JP2018-045940

(51) Int. Cl.
*B25J 9/16*    (2006.01)
*B25J 13/08*    (2006.01)
(Continued)

(52) U.S. Cl.
CPC ........... *B25J 9/1669* (2013.01); *B25J 9/1612* (2013.01); *B25J 9/1664* (2013.01); *B25J 9/1697* (2013.01);
(Continued)

(58) Field of Classification Search
CPC ...... B25J 9/1669; B25J 9/1612; B25J 9/1664; B25J 9/1697; B25J 13/08; G06T 7/0004;
(Continued)

(56) References Cited

U.S. PATENT DOCUMENTS 5,446,835 A * 8/1995 Iida .................... B25J 9/1697
700/259
5,579,444 A * 11/1996 Dalziel ................. B25J 9/1697
382/153
(Continued)

FOREIGN PATENT DOCUMENTS

JP    2010069542    4/2010
JP    2010091429    4/2010
(Continued)

OTHER PUBLICATIONS

Schraft et al, Intelligent picking of chaotically stored objects, 2003, Emerald Insight, Assembly Automation, vol. 23, No. 1 • 2003 • pp. 38-42, MCB UP Limited • ISSN 0144-5154, DOI 10.1108/01445150310460079 (Year: 2003).*
(Continued)

*Primary Examiner* — Jaime Figueroa
(74) *Attorney, Agent, or Firm* — JCIPRNET

(57) ABSTRACT

A workpiece picking device includes a sensor that measures the workpieces, a hand that grasps the workpieces, a robot that moves the hand, and a control device thereof. The control device has a position orientation calculation part that calculates position, orientation and the like of the workpieces, a grasping orientation calculation part that calculates a grasping orientation of the workpieces by the hand, a route calculation part that calculates a route through which the hand moves to the grasping orientation, a sensor control part, a hand control part, a robot control part, a situation determination part that determines the situation of the workpieces on the basis of measurement result or the like of the
(Continued)

three-dimensional position, and a parameter modification part that modifies at least one of a measurement parameter and various calculation parameters, when the determination result of the situations of the workpieces satisfies a predetermined condition.

20 Claims, 6 Drawing Sheets

(51) Int. Cl.
  *G06T 7/70*  (2017.01)
  *G06T 7/00*  (2017.01)
  *H04N 23/72*  (2023.01)
(52) U.S. Cl.
  CPC ............. *B25J 13/08* (2013.01); *G06T 7/0004* (2013.01); *G06T 7/70* (2017.01); *H04N 23/72* (2023.01); *G05B 2219/40269* (2013.01); *G06T 2207/30164* (2013.01)
(58) Field of Classification Search
  CPC ........... G06T 7/70; G06T 2207/30164; H04N 23/72; G05B 2219/40269
  USPC ................ 700/245–264; 318/568.11–568.25
  See application file for complete search history.

(56) References Cited

U.S. PATENT DOCUMENTS

| | | | | |
|---|---|---|---|---|
| 6,597,971 | B2* | 7/2003 | Kanno | B25J 9/1666 901/7 |
| 6,721,444 | B1* | 4/2004 | Gu | G06T 7/97 382/218 |
| 7,269,479 | B2* | 9/2007 | Okamoto | B25J 9/0003 901/2 |
| 7,313,464 | B1* | 12/2007 | Perreault | B25J 9/1666 700/262 |
| 7,657,346 | B2* | 2/2010 | Ban | B25J 9/1697 700/250 |
| 7,996,114 | B2* | 8/2011 | Ban | B25J 9/1697 382/153 |
| 8,098,928 | B2* | 1/2012 | Ban | G06T 1/0007 700/83 |
| 8,559,699 | B2* | 10/2013 | Boca | B25J 9/1697 382/153 |
| 8,660,685 | B2* | 2/2014 | Irie | B25J 9/1697 414/730 |
| 9,079,310 | B2* | 7/2015 | Kumiya | B25J 9/1697 |
| 9,089,966 | B2* | 7/2015 | Domae | B25J 9/1612 |
| 9,102,053 | B2* | 8/2015 | Suzuki | B25J 9/1697 |
| 9,333,649 | B1* | 5/2016 | Bradski | B25J 19/00 |
| 9,616,572 | B2* | 4/2017 | Watanabe | B25J 9/1697 |
| 9,764,467 | B2* | 9/2017 | Harada | B25J 9/1612 |
| 10,350,752 | B2* | 7/2019 | Satou | B25J 9/161 |
| 10,434,655 | B2* | 10/2019 | Suzuki | B25J 9/1692 |
| 10,675,763 | B2* | 6/2020 | Watanabe | B25J 9/1697 |
| 10,974,386 | B2* | 4/2021 | Shimodaira | B25J 9/1669 |
| 11,511,421 | B2* | 11/2022 | Konishi | G06T 7/50 |
| 2002/0169522 | A1* | 11/2002 | Kanno | G05B 19/4061 700/245 |
| 2004/0190766 | A1* | 9/2004 | Watanabe | B25J 9/1697 382/209 |
| 2007/0124024 | A1* | 5/2007 | Okamoto | B25J 9/0003 700/245 |
| 2007/0213874 | A1* | 9/2007 | Oumi | B25J 9/1697 700/245 |
| 2007/0274812 | A1* | 11/2007 | Ban | B25J 9/1697 414/217 |
| 2008/0181485 | A1* | 7/2008 | Beis | B25J 9/1697 382/209 |
| 2008/0240511 | A1* | 10/2008 | Ban | G06T 1/0007 901/30 |
| 2008/0253612 | A1* | 10/2008 | Reyier | B25J 9/1697 901/6 |
| 2009/0234502 | A1* | 9/2009 | Ueyama | B25J 9/1697 700/259 |
| 2010/0004778 | A1* | 1/2010 | Arimatsu | G06T 1/0014 700/214 |
| 2010/0092032 | A1* | 4/2010 | Boca | B25J 9/1679 348/222.1 |
| 2010/0324737 | A1* | 12/2010 | Handa | G06T 7/73 356/601 |
| 2011/0098859 | A1* | 4/2011 | Irie | B25J 9/1687 901/31 |
| 2011/0157178 | A1* | 6/2011 | Tuzel | G06T 7/586 345/426 |
| 2012/0158180 | A1* | 6/2012 | Iio | B25J 9/1679 901/31 |
| 2012/0265342 | A1* | 10/2012 | Kumiya | B25J 9/1676 700/255 |
| 2013/0006423 | A1* | 1/2013 | Ito | B25J 9/1612 901/46 |
| 2013/0211593 | A1* | 8/2013 | Domae | B25J 9/1612 700/258 |
| 2013/0238128 | A1* | 9/2013 | Suzuki | B25J 9/1697 700/258 |
| 2014/0067126 | A1* | 3/2014 | Watanabe | G06T 7/75 382/103 |
| 2014/0067127 | A1* | 3/2014 | Gotou | B25J 9/1697 700/259 |
| 2015/0003678 | A1* | 1/2015 | Watanabe | G06T 19/20 382/103 |
| 2015/0224650 | A1* | 8/2015 | Xu | B25J 9/1692 414/730 |
| 2015/0276383 | A1* | 10/2015 | Yoshikawa | G01B 11/14 348/136 |
| 2016/0059419 | A1* | 3/2016 | Suzuki | B25J 9/1692 901/14 |
| 2016/0075031 | A1* | 3/2016 | Gotou | B25J 9/1633 901/34 |
| 2017/0028561 | A1* | 2/2017 | Yamada | B25J 19/023 |
| 2017/0028562 | A1* | 2/2017 | Yamazaki | B25J 9/163 |
| 2017/0173798 | A1* | 6/2017 | Watanabe | B25J 9/1697 |
| 2018/0250820 | A1* | 9/2018 | Shimodaira | B25J 9/1669 |
| 2018/0253516 | A1* | 9/2018 | Shimano | B25J 9/1671 |
| 2018/0257225 | A1* | 9/2018 | Satou | B25J 9/1697 |
| 2019/0039237 | A1* | 2/2019 | Nakashima | B65G 47/90 |
| 2019/0255706 | A1* | 8/2019 | Atohira | G06F 30/20 |
| 2019/0308320 | A1* | 10/2019 | Konishi | G06V 10/761 |
| 2020/0230821 | A1* | 7/2020 | Watanabe | B25J 9/1697 |

FOREIGN PATENT DOCUMENTS

| | | |
|---|---|---|
| JP | 2010120141 | 6/2010 |
| JP | 2014237188 | 12/2014 |
| JP | 2015202544 | 11/2015 |
| JP | 2016078180 | 5/2016 |
| JP | 2016097481 | 5/2016 |
| JP | 2016132086 | 7/2016 |
| JP | 2017030135 | 2/2017 |

OTHER PUBLICATIONS

Saldner, Henrik, PalletPicker-3D, the solution for picking of randomly placed parts, 2003, Emeral Insight, Assembly Automation vol. 23 • No. 1 • 2003 • pp. 29-31, MCB UP Limited • ISSN 0144-5154, DOI 10.1108/01445150310460042 (Year: 2003).*

Yanagihara et al, Parts-picking in Disordered Environment, 1991, IEEE, IEEE/RSJ International Workshop on Intelligent Robots and Systems IROS '91. Nov. 3-5. 1991. Osaka, Japan. IEEE Cat. No. 91TH0375-6 (Year: 1991).*

"Search Report of Europe Counterpart Application", dated Dec. 10, 2021, p. 1-p. 5.

"International Search Report (Form PCT/ISA/210) of PCT/JP2019/009593", dated May 28, 2019, with English translation thereof, pp. 1-4.

(56) References Cited

OTHER PUBLICATIONS

"Written Opinion of the International Searching Authourity (Form/ISA/237) of PCT/JP2019/009593", dated May 16, 2019, with English translation thereof, p. 1-p. 10.

* cited by examiner

WORKPIECE PICKING DEVICE AND WORKPIECE PICKING METHOD

CROSS-REFERENCE TO RELATED APPLICATION

This application is a 371 application of the international PCT application serial no. PCT/JP2019/009593, filed on Mar. 11, 2019, which claims the priority benefit of Japan application no. 2018-045940, filed on Mar. 13, 2018. The entirety of each of the above—mentioned patent applications is hereby incorporated by reference herein and made a part of this specification.

BACKGROUND

Technical Field

The present invention relates to a workpiece picking device and a workpiece picking method.

Related Art

Conventionally, there has been known a device (so-called a bulk picking device) that recognizes positions and orientations of individual components (workpieces) from bulk components stacked and placed disorderly and takes out the workpieces one by one by a robot. Such a bulk picking device is proposed in Patent Literature 1 in which a robot hand is moved forward to a workpiece grasping target position, a grasping state is checked, and when the grasping state is not good, the workpiece grasping target position is modified to move the robot hand forward until a good grasping state is obtained.

LITERATURE OF RELATED ART

Patent Literature

Patent Literature 1: Japanese Patent Laid-Open No. 2010-69542

SUMMARY

Problems to be Solved

In the aforementioned conventional bulk picking device, the positions and orientations of individual workpieces are recognized by three-dimensionally measuring the workpieces stacked in bulk with a distance sensor and collating the obtained measurement results with the three-dimensional CAD model of the workpiece. At that time, in general, a user sets a predetermined value in advance before measurement as a measurement parameter for performing three-dimensional measurement by the distance sensor.

However, even if the user appropriately sets such measurement parameters, because some measured values may be missed or omitted due to environmental changes around the workpiece or changes in surface condition of the workpiece, it was not possible to perform the three-dimensional measurement on all the workpieces stacked in bulk. In particular, when the number of picking times of workpieces increases and the number of remaining workpieces decreases, there was a problem of a gradual increase in a proportion of workpieces with missed or omitted measured values, that is, a difficulty in detection of the workpiece. In other words, in general, because a workpiece with stable measured values of the position and orientation is preferentially picked prior to other workpieces, as the picking operation progresses toward the end, there was a tendency of an increase in the number of workpieces that cannot be picked because of the difficulty in detection.

Therefore, in an aspect, the present invention has been made in view of such circumstances, and an objective thereof is to provide a workpiece picking technique capable of improving a success rate of grasping workpieces stacked in bulk and realizing a good picking operation.

Means to Solve Problems

The present invention adopts the following configurations to solve the aforementioned problems.

[1] An example of a workpiece picking device according to the present disclosure is configured to take out stacked workpieces. The workpiece picking device includes a sensor that measures three-dimensional positions of the workpieces; a hand that grasps the workpieces; a robot that moves the hand to and from a grasping position; and a control device that controls the sensor, the hand, and the robot. Besides, the control device has: a position orientation calculation part that calculates, on the basis of measurement results of the three-dimensional positions and using a predetermined calculation parameter, positions and orientations of the workpieces, and calculates the workpiece number in which positions and orientations are detected; a grasping orientation calculation part that calculates, on the basis of the calculation results of the positions and orientations and using a predetermined calculation parameter, a grasping orientation of the hand when the hand grasps the workpieces; a route calculation part that calculates, using a predetermined calculation parameter, a route through which the hand moves to the grasping orientation; a sensor control part that controls the operation of the sensor on the basis of measurement parameters when measuring the three-dimensional positions; a hand control part that controls the operation of the hand on the basis of the grasping orientation; a robot control part that controls the operation of the robot on the basis of the route; a situation determination part that determines situations of the workpieces on the basis of the measurement results of the three-dimensional positions and the calculation results of the workpiece number; and a parameter modification part that modifies a parameter including at least one of a measurement parameter when measuring the three-dimensional positions, a calculation parameter of the positions and orientations, a calculation parameter of the grasping orientation, and a calculation parameter of the route, when the determination results of situations of the workpieces satisfy a predetermined condition.

In this configuration, each of three-dimensional positions of the stacked workpieces is measured using a predetermined measurement parameter, the positions and orientations of the workpieces and the number of detected workpieces are calculated on the basis of the measurement result thereof, and the situation of the workpieces is determined on the basis of the above results. Further, depending on the situations, the parameter including at least one of the measurement parameter, the calculation parameter of the position and orientation, the calculation parameter of the grasping orientation, and the calculation parameter of the route is modified to perform a re-measurement or a re-calculation, and then the workpieces are picked. Therefore, even if missing or omission occurs in the measured value of the workpieces in the initial three-dimensional measurement, the success rate of grasping the workpiece can be improved (a failure rate can be reduced).

Further, the "success rate" here does not mean a rate at which the workpieces could be grasped when the hand tried to grasp the workpieces, but represents a rate at which the three-dimensional positions of the remaining workpieces can be measured (the remaining workpieces can be detected by the workpiece picking device), and as a result, the picking of the workpieces is successful. In other words, the "failure rate" here does not mean a rate at which the hand tried to grasp the workpiece but failed to grasp the workpiece, but represents a rate at which, despite the fact that the workpieces still remain, the picking of the workpiece is not successful because the three-dimensional positions of the workpieces cannot be measured (the remaining workpieces cannot be detected by the workpiece picking device). In addition, the sensor may be fixed or movably installed. In the latter case, the sensor may have a drive mechanism, or the sensor may be attached to, for example, a robot.

[2] In the aforementioned configuration, the control device may include a defective region extraction part which extracts a defective region from the measurement results of the three-dimensional positions, and the situation determination part may determine the situations of the workpieces on the basis of the workpiece number and a position, an area or a volume of the defective region. Here, the "defective region" represents a region in which, although the measured value of the three-dimensional positions of the workpieces should be originally obtained within a measurement range of the sensor, the measured value of the three-dimensional position of the workpiece cannot be obtained, and missing or omission occurs in the measured value.

With such a configuration, because the situation of the workpiece is determined on the basis of both the number of detected workpieces and the feature amount (position, area or volume) related to the defective region, it is possible to more reliably grasp the state of the workpieces that still remain. As a result, it is possible to accurately determine whether the measurement parameter and various calculation parameters need to be modified.

[3] In the aforementioned configuration, the control device may include a planar region extraction part which extracts a planar region from the measurement results of the three-dimensional positions, and the situation determination part may determine the situations of the workpieces on the basis of the workpiece number and a position, a distance or an area of the planar region. Here, the "planar region" is a region recognized as a "plane" in the measured value of the three-dimensional position of the workpiece. More specifically, the "planar region" corresponds to, for example, a bottom surface of a container in which the workpieces are stored, a surface of a support table on which the workpieces are stacked, or the like.

With such a configuration, because the situation of the workpiece is determined on the basis of both the number of detected workpieces and the feature amount (position, distance or area) related to the planar region, it is possible to more reliably grasp the state of the workpiece that still remains. As a result, it is possible to accurately determine whether the measurement parameter or various calculation parameters need to be modified.

[4] In the aforementioned configuration, the parameter modification part may modify the parameter when the workpiece number is equal to or less than a predetermined value.

With such a configuration, because a threshold value is set for the workpiece number for determining whether the parameter needs to be modified, in particular, when the number of detected workpieces is small relative to the number of workpieces expected to remain, it is possible to more accurately determine whether the parameter needs to be modified.

[5] In the aforementioned configuration, the parameter modification part may modify the parameter when the area or volume of the defective region is equal to or greater than a predetermined value or when the position of the defective region exists in a predetermined range within a placement region of the workpiece. Here, the "placement region" refers to a finite region on which the workpieces are placed. More specifically, the "placement region" corresponds to, for example, a container in which the workpieces are stored, a support table on which the workpieces are stacked, or the like.

With such a configuration, because a threshold value is set for the area, volume, or position of the defective region for determining whether the parameter needs to be modified, in particular, when there are many missing or omissions of the measured value of the workpiece with respect to the number of workpieces expected to remain, it is possible to more accurately determine whether the parameter needs to be modified.

[6] In the aforementioned configuration, the parameter modification part may modify the parameters when the distance or area of the planar region is equal to or less than a predetermined value or when the position of the planar region exists in a predetermined range with respect to the placement surface of the workpieces. Here, the "distance of the planar region" represents a distance between an appropriate reference position and the detected position of the planar region. Further, the "placement surface" represents a surface of a finite region on which the workpieces are placed. More specifically, the "placement surface" corresponds to, for example, the bottom surface of the container in which the workpieces are stored or the surface of the support table on which the workpieces are stacked.

With such a configuration, because a threshold value is set for the distance, area, or position of the planar region for determining whether the parameter needs to be modified, it is possible to more accurately determine whether the parameter needs to be modified.

[7] In the aforementioned configuration, the parameter modification part may limit the modification of the parameter within a predetermined number of times.

With such a configuration, because the modifying processing of the parameter is not performed when exceeding a predetermined number of times, it is possible to prevent the processing time from increasing due to repetition of the process even when the success rate of grasping the workpiece cannot be increased significantly.

[8] In the aforementioned configuration, the parameter modification part may be configured to modify at least one of an exposure time, an illumination illuminance, and a measurement position as measurement parameters when measuring the three-dimensional positions.

With such a configuration, because particularly the main parameters such as the exposure time, illumination illuminance, and measurement position are modified among the measurement parameters of the three-dimensional positions of the workpieces, the three-dimensional position of the workpieces can be more accurately detected at the time of re-measurement, and as a result, it is possible to reduce an occurrence of missing or omission of the measured values.

[9] In the aforementioned configuration, the parameter modification part may modify at least one of the exposure time, the illumination illuminance, and the measurement position on the basis of brightness of the defective region.

With such a configuration, because the brightness of the defective region is focused on, it is easy to specify the cause of the defective region, and as a result, it is possible to more appropriately reset the main measurement parameters such as the exposure time, the illumination illuminance, and the measurement position.

[10] In the aforementioned configuration, the parameter modification part may modify a threshold value of the position orientation calculation as a calculation parameter of the position and orientation.

With such a configuration, by modifying the threshold value of position orientation calculation, it is easy to detect individual workpieces even when missing or omission occurs in the measured values of the workpieces or the workpieces overlap each other. Therefore, the number of workpieces as grasping candidate can be increased, and as a result, the success rate of grasping can be further enhanced.

[11] In the aforementioned configuration, the parameter modification part may modify a threshold value of the grasping orientation calculation as a calculation parameter of the grasping orientation.

With such a configuration, by modifying the threshold value of the grasping orientation calculation, the workpieces is easily grasped by the hand even when the gap between the workpieces is small (when the workpieces are close to each other) or even when, for example, the workpieces stored in the container exist near the wall of the container. As a result, the success rate of grasping the workpiece can be further enhanced.

[12] In the aforementioned configuration, the parameter modification part may modify a threshold value of interference determination as a calculation parameter of the route.

With such a configuration, by modifying the threshold value of interference determination, the hand can be more actively moved to the grasping position of the workpiece, and thus the success rate of grasping the workpiece can be further enhanced.

[13] In the aforementioned configuration, the parameter modification part may modify the parameter depending on the number of modification times of the parameter.

With such a configuration, because each parameter is modified depending on the number of modification times of the parameter, it is possible to set an appropriate parameter corresponding to the situation in which picking of the workpiece progresses and the number of remaining workpieces decreases, and as a result, the success rate of grasping the workpiece can be further enhanced.

[14] An example of a workpiece picking method according to the present disclosure is a method that can be effectively implemented using an example of the workpiece picking device having the aforementioned configuration, and includes the following steps. That is, the method is a method for taking out stacked workpieces by using a workpiece picking device equipped with a sensor, a hand, a robot, and a control device. The method includes: a measuring step in which the sensor measures three-dimensional positions of the workpieces; a grasping step in which the hand grasps the workpieces; a moving step in which the robot moves the hand to and from a grasping position; and a controlling step in which the control device controls the sensor, the hand, and the robot. Besides, the controlling step has: a position orientation calculating step of calculating, on the basis of measurement results of the three-dimensional positions and using a predetermined calculation parameter, positions and orientations of the workpieces, and calculating the workpiece number in which positions and orientations are detected; a grasping orientation calculating step of calculating, on the basis of the calculation results of the positions and orientations and using a predetermined calculation parameter, a grasping orientation of the hand when the hand grasps the workpieces; a route calculating step of calculating, using a predetermined calculation parameter, a route through which the hand moves to the grasping orientation; a sensor controlling step of controlling the operation of the sensor on the basis of measurement parameters when measuring the three-dimensional positions; a hand controlling step of controlling the operation of the hand on the basis of the grasping orientation; a robot controlling step of controlling the operation of the robot on the basis of the route; a situation determining step of determining situations of the workpieces on the basis of the measurement results of the three-dimensional positions and the calculation results of the workpiece number; and a parameter modifying step of modifying a parameter including at least one of a measurement parameter when measuring the three-dimensional positions, a calculation parameter of the positions and orientations, a calculation parameter of the grasping orientation, and a calculation parameter of the route, when the determination results of situations of the workpieces satisfy a predetermined condition.

Moreover, in the present disclosure, the terms "part" and "device" do not simply mean physical means, but also include a configuration in which functions of the "part" and "device" are realized by software. Further, the function of one "part" and "device" may be realized by two or more physical means or devices, or the functions of two or more "parts" and "devices" may be realized by a single physical means or device. Furthermore, the terms "part" and "device" are concepts that can be paraphrased as, for example, "means" and "system".

Effect

According to the present invention, it is possible to improve the success rate of grasping the workpieces stacked in bulk, as compared with the conventional picking based on the three-dimensional measurement of the workpiece in which a single measurement parameter is set, and as a result, it is possible to realize a good picking operation.

DESCRIPTION OF THE EMBODIMENTS

Figure 1:
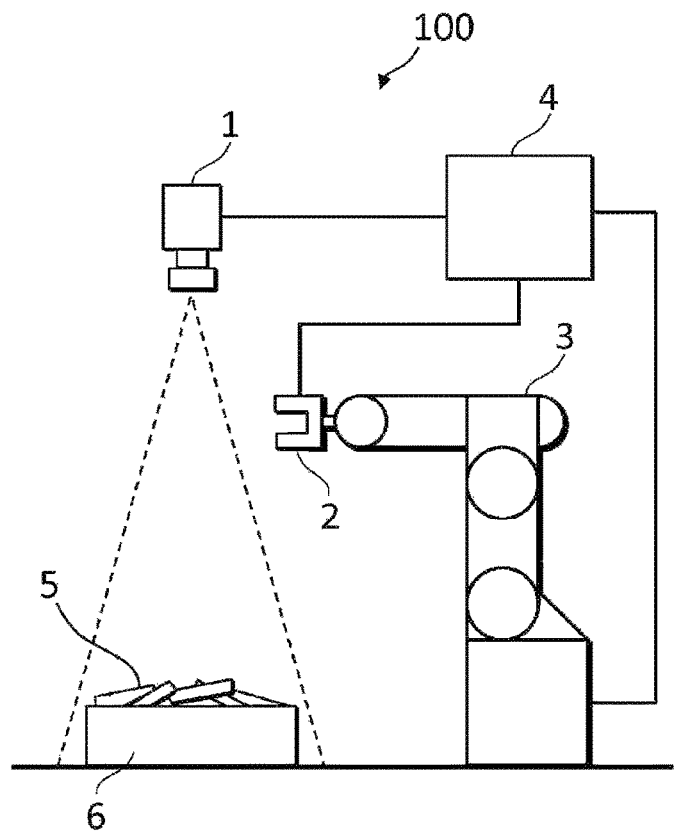
FIG. 1 is a plan view schematically showing an example of an application scene of a workpiece picking device according to an embodiment.

Hereinafter, embodiments according to an example of the present disclosure (hereinafter, also referred to as "embodiments") will be described with reference to the drawings. However, the embodiments described below are merely examples, and are not intended to exclude various modifications and application of techniques which are not explicitly described below. That is, the example of the present disclosure can be variously modified and implemented without departing from the spirit thereof. Further, in the following description of the drawings, the same or similar portions are denoted by the same or similar reference numerals, and the drawings are schematic and do not necessarily match actual dimensions, ratios and the like. Furthermore, portions having different dimensional relationships and ratios may be included in the drawings.

§ 1 Application Example

First, an example of a scene to which the example of the present disclosure is applied is described with reference to FIG. 1. FIG. 1 is a plan view schematically showing an example of an application scene of a workpiece picking device 100 according to the present embodiment. The workpiece picking device 100 according to the present embodiment is a device for, for example, taking out a plurality of workpieces 5 stacked in bulk inside a supply device such as a storage container 6 from the storage container 6, transferring the workpieces 5 to an appropriate tray or the like (not shown), aligning and arranging the workpieces 5.

In the example of FIG. 1, the workpiece picking device 100 is equipped with a sensor 1, a hand 2, a robot 3, and a control device 4.

The sensor 1 is a distance sensor for measuring a three-dimensional position of the workpiece 5, is configured to include, for example, a camera device equipped with a general optical sensor, and captures an image of the workpiece 5 at a predetermined viewing angle. The hand 2 has a grasping mechanism capable of performing operations for grasping and separating the individual workpieces 5. The robot 3 is provided with the hand 2 at a front end of an arm portion of the robot 3, and has a drive mechanism for moving the hand 2 to the grasping position of the workpiece 5 in the storage container 6, and moving the hand 2 grasping the workpiece 5 from the grasping position to the above-mentioned tray or the like. The control device 4 is connected to each of the sensor 1, the hand 2 and the robot 3, and is intended to control processing relating to various operations or calculations required in the workpiece picking device 100, in addition to measurement processing of the workpiece 5 performed by the sensor 1, grasping processing of the workpiece 5 performed by the hand 2, and driving processing of the robot 3.

Here, the measurement method of the three-dimensional position of the workpiece 5 is not particularly limited, and for example, it is possible to appropriately select and use various active measurement methods that use straightness of light (for example, a spatial coded pattern projection method based on triangulation as a basic principle, a time coded pattern projection method, moire topography, etc.), various passive measurement methods that use straightness of light (for example, a stereo camera method based on triangulation as a basic principle, a visual volume intersection method, a factorization method, a depth from focusing method based on coaxial distance measurement as a basic principle, etc.), and various active measurement methods that use the speed of light (for example, an optical time difference (TOF) measurement method based on simultaneous distance measurement as a basic principle, a laser scanning method, etc.).

Further, as necessary, the sensor 1 may have a projector (not shown) which projects a so-called 3D illumination including appropriate measurement light (for example, pattern light or scan light used in an active method) or a so-called 2D illumination that is normal illumination onto the workpiece 5. The configuration of such a projector is not particularly limited either, and for example, in the case of projecting the pattern light, it is possible to provide, as an example, a configuration including a laser light source, a pattern mask, and a lens. Light emitted from the laser light source is converted into measurement light (pattern light) having a predetermined pattern by a pattern mask on which a predetermined pattern is formed, and the light is projected onto the workpiece 5 via the lens.

More specifically, the control device 4 performs respective processing shown in (1) to (7) described below.

(1) Position Orientation Calculation Processing

The position and orientation of the workpiece 5 (three-dimensional coordinates and rotation angles around a three-dimensional axis), and the number of workpieces 5 (workpiece number) in which the position and orientation are detected are calculated, using a predetermined calculation parameter on the basis of three-dimensional point group data representing a three-dimensional position of the workpiece 5 obtained by the sensor 1 and a two-dimensional image corresponding to the three-dimensional point group data.

(2) Grasping Orientation Calculation Processing

A grasping orientation of the hand 2 when the hand 2 grasps the workpiece 5 is calculated using a predetermined calculation parameter on the basis of the calculation result of the position and orientation of the workpiece 5.

(3) Route Calculation Processing

A route for moving the hand 2 from an initial orientation to the grasping orientation is calculated using a predetermined calculation parameter on the basis of the initial orientation (an initial position) of the hand 2 and the calculation result of the grasping orientation of the hand 2 when grasping the workpiece 5.

(4) Region Extraction Processing

In the three-dimensional point group data that represents the three-dimensional position of the workpiece 5 obtained by the sensor 1, a region (a defective region) in which the measured values of the three-dimensional position of the workpiece 5 are not obtained and missing or omission occurs in the measured values, despite that it is a region in which the measured values of the three-dimensional position of the workpiece 5 should originally be obtained, is extracted.

(5) Situation Determination Processing

The situations of the workpieces 5 are determined on the basis of the number of the workpieces 5 (workpiece number) in which positions and orientations are detected and the measurement result of the three-dimensional positions of the workpieces 5 (for example, a defective region extracted from the three-dimensional point group data). Here, regarding the workpiece number, for example, in the case of a situation in which the workpiece number detected by the sensor 1 is significantly smaller than the number of remaining workpieces that can be estimated from the history of picking until then, or no workpiece 5 is detected (the workpiece number=0), the state of the workpieces 5 still remaining can be more reliably understood by the parameter modification processing shown in (6) described later. Further, regarding the defective region extracted as the measurement result, in the case of a situation in which a ratio of the defective region to the entire measurement range (a field of view) of the sensor 1 is significantly large, the state of the workpiece 5 still remaining can be more reliably understood by the parameter modification processing shown in (6) described later.

Thus, in the present embodiment, it is determined, as the situation of the workpiece 5, whether the workpiece number in which positions and orientations are detected and the feature amount of the defective region extracted from the three-dimensional point group data satisfy predetermined conditions. More specifically, for example, it is determined, as the situations of the workpiece 5, whether the workpiece number in which positions and orientations are detected is equal to or less than a predetermined value, and whether an "area" or "volume" that is a feature amount of the defective region extracted from the three-dimensional point group data is equal to or greater than a predetermined value, or whether the "position", which is a feature amount of the defective region, exists within a predetermined range in the placement region of the workpiece 5 (inside the storage container 6).

(6) Parameter Modification Processing

When the determination result of the situation of the workpiece 5 satisfies a predetermined condition (the determination condition exemplified in the above (5)), the measurement parameter when measuring the three-dimensional position of the workpiece 5 is modified (calculated). Moreover, the present embodiment is an example of an aspect of modifying the measurement parameter. However, in a first configuration example to a third configuration example described later, aspects in which the calculation parameter when calculating the position and orientation of the workpiece 5, the calculation parameter when calculating the grasping orientation of the workpiece 5 by the hand 2, and the calculation parameter when calculating the route from the initial orientation of the hand 2 to the grasping orientation are modified (calculated, or selected from a table prepared in advance) is provided as an example.

(7) Various Control Processing

The operation of the sensor 1 is controlled on the basis of the measurement parameter when measuring the three-dimensional position of the workpiece 5, the operation of the hand 2 is controlled on the basis of the calculated grasping orientation, and the operation of the robot 3 is controlled on the basis of the calculated route.

As described above, the control device 4 corresponds to an example of each of a "position orientation calculation part", a "grasping orientation calculation part", a "route calculation part", a "sensor control part", a "hand control part", a "robot control part", a "situation determination part", and a "parameter modification part" according to the present invention.

From the above, according to the workpiece picking device 100 of the present embodiment, it is possible to improve the difficulty of grasping a workpiece, which was a problem in the conventional device, and improve the success rate when grasping the workpiece. That is, in the conventional device, due to setting of a single measurement parameter and measuring the three-dimensional position of the workpiece, as the number of picking times of the workpiece increases, the proportion of occurrence of missing or omission in the measured values increases. As a result, there was a tendency of a difficulty in good picking. In contrast, according to the workpiece picking device 100 of the present embodiment, the three-dimensional position of the workpiece 5 is measured again by the sensor 1 after appropriately modifying the measurement parameter depending on the actual situation of the workpiece. Accordingly, even when the number of picking times increases, it is possible to reliably detect the workpiece and realize an accurate picking operation.

§ 2 Configuration Example

[Hardware Configuration]

Figure 2:
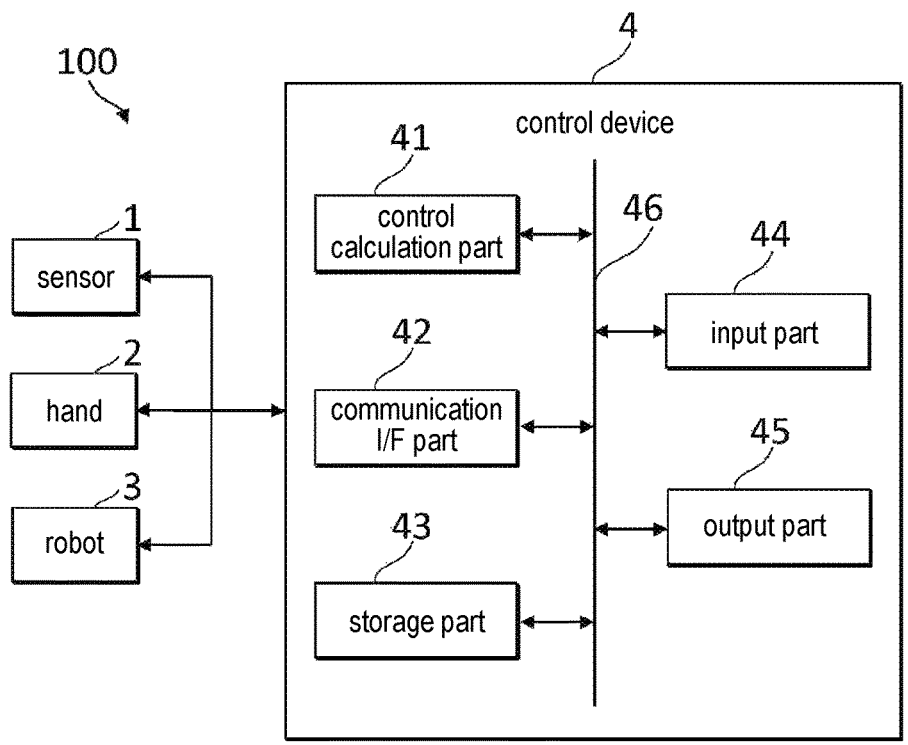
FIG. 2 is a plan view schematically showing an example of the hardware configuration of the workpiece picking device according to the embodiment.

Next, an example of the hardware configuration of the workpiece picking device 100 according to the present embodiment is described with reference to FIG. 2. FIG. 2 is a plan view schematically showing an example of the hardware configuration of the workpiece picking device 100 according to the present embodiment.

In the example of FIG. 2, the workpiece picking device 100 includes the sensor 1, the hand 2, the robot 3, and the control device 4 shown in FIG. 1. Here, the control device 4 includes a control calculation part 41, a communication interface (I/F) part 42, a storage part 43, an input part 44, and an output part 45, and each part can be connected to be communicable with each other via a bus line 46.

The control calculation part 41 includes a central processing unit (CPU), a random access memory (RAM), a read only memory (ROM), and the like, and controls each constituent element and performs various calculations depending on information processing.

The communication I/F part 42 is, for example, a communication module for communicating with "a part" and "a device" which are other constituent components, by wire or wirelessly. The communication type in which the communication I/F part 42 is used for communication is arbitrary and may be, for example, a local area network (LAN), a universal serial bus (USB) and the like, and an appropriate communication line equivalent to the bus line 46 can also be applied. The sensor 1, the hand 2, and the robot 3 can be arranged to be communicable with the control calculation part 41 or the like via the communication I/F part 42.

The storage part 43 is an auxiliary storage device such as a hard disk drive (HDD) or a solid state drive (SSD), and stores various programs executed by the control calculation part 41 (calculation program for executing various processing shown in the above (1) to (6), control program for performing control processing of each operation of the sensor 1, the hand 2, and the robot 3 shown in the above (7), etc.), three-dimensional point group data or second-dimensional images that are output from the sensor 1, database including measurement parameters or various calculation parameters, data of various calculation results, data regarding picking situation or picking record of the workpiece 5, three-dimensional CAD model data of the workpiece 5, and the like. As described above, the calculation program and the control program stored in the storage part 43 are executed by the control calculation part 41, and thereby various processing functions in the functional configuration example described later are realized.

The input part 44 is an interface device for receiving various input operations from the user who uses the workpiece picking device 100, and can be realized by, for example, a mouse, a keyboard, a touch panel, a voice microphone, or the like. The output part 45 is an interface device for notifying the user or the like who uses the workpiece picking device 100 of various types of information by display, voice, printing, etc., and can be realized by, for example, a display, a speaker, a printer, or the like.

[Function Configuration]

Figure 3:
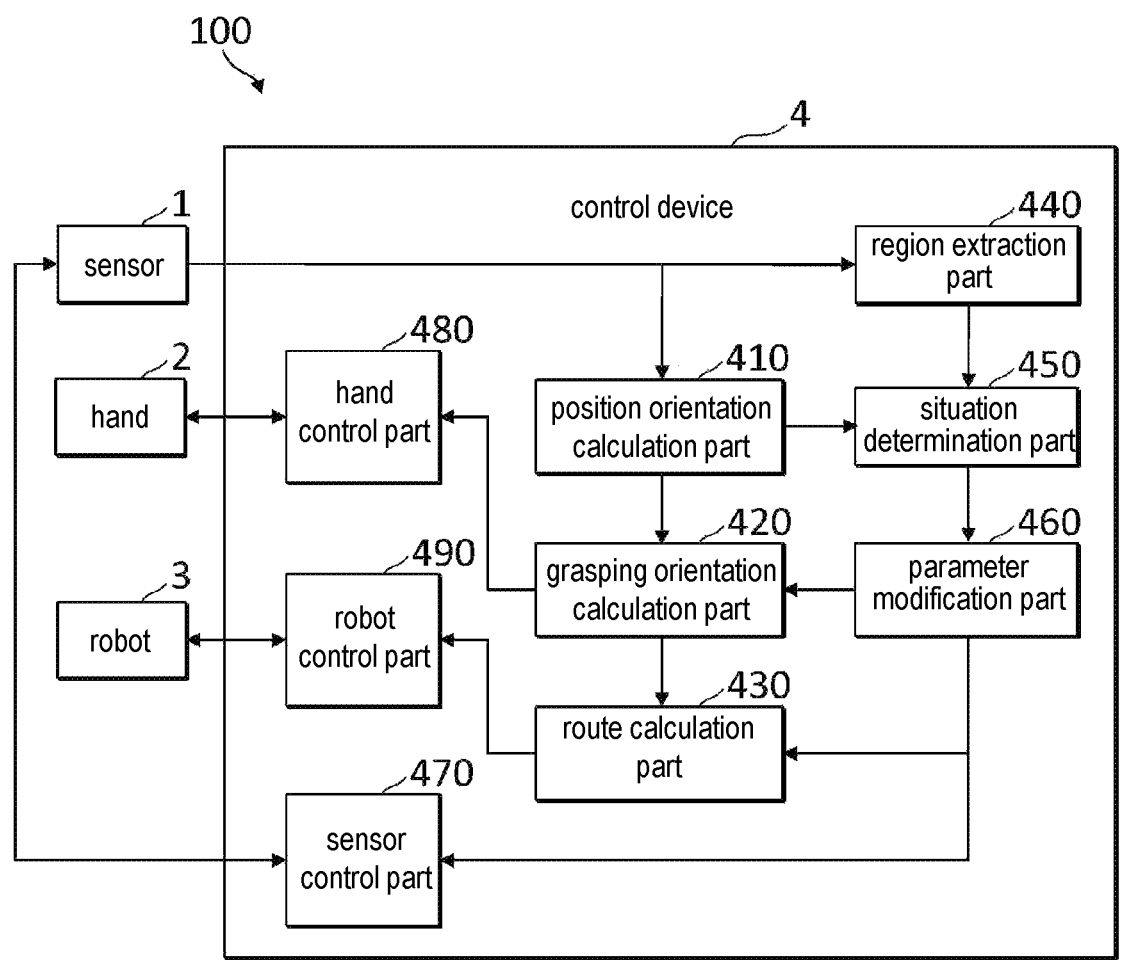
FIG. 3 is a plan view schematically showing an example of the functional configuration of the workpiece picking device according to the embodiment.

Next, an example of the functional configuration of the workpiece picking device 100 according to the present embodiment is described with reference to FIG. 3. FIG. 3 is a plan view schematically showing an example of the functional configuration of the workpiece picking device 100 according to this embodiment.

The control calculation part 41 of the workpiece picking device 100 shown in FIG. 2 expands various programs (control program, calculation program, etc.) stored in the storage part 43 in the RAM. Then, the control calculation part 41 interprets and executes the various programs expanded in the RAM by the CPU to control various constituent elements. As a result, as shown in FIG. 3, the workpiece picking device 100 according to the present embodiment can realize a configuration including the control device 4 which has a position orientation calculation part 410, a grasping orientation calculation part 420, a route calculation part 430, a region extraction part 440, a situation determination part 450, and a parameter modification part 460 that each execute the respective processing shown in the above (1) to (6), and a sensor control part 470, a hand control part 480, and a robot control part 490 that execute the control processing described in the above (7).

Moreover, in the present embodiment, an example in which each function realized by the control device 4 included in the workpiece picking device 100 is realized by a general-purpose CPU has been described. However, some or all of the aforementioned functions may be realized by one of a plurality of dedicated processors. In addition, it is evident that, in the functional configuration of the control device 4 included in the workpiece picking device 100, the functions may be omitted, replaced, or added as appropriate depending on the embodiment or the configuration example. In addition, the "control device" can be understood as a general information processing device (e.g., a computer, a workstation, etc.).

§ 3 Operation Example

Figure 4:
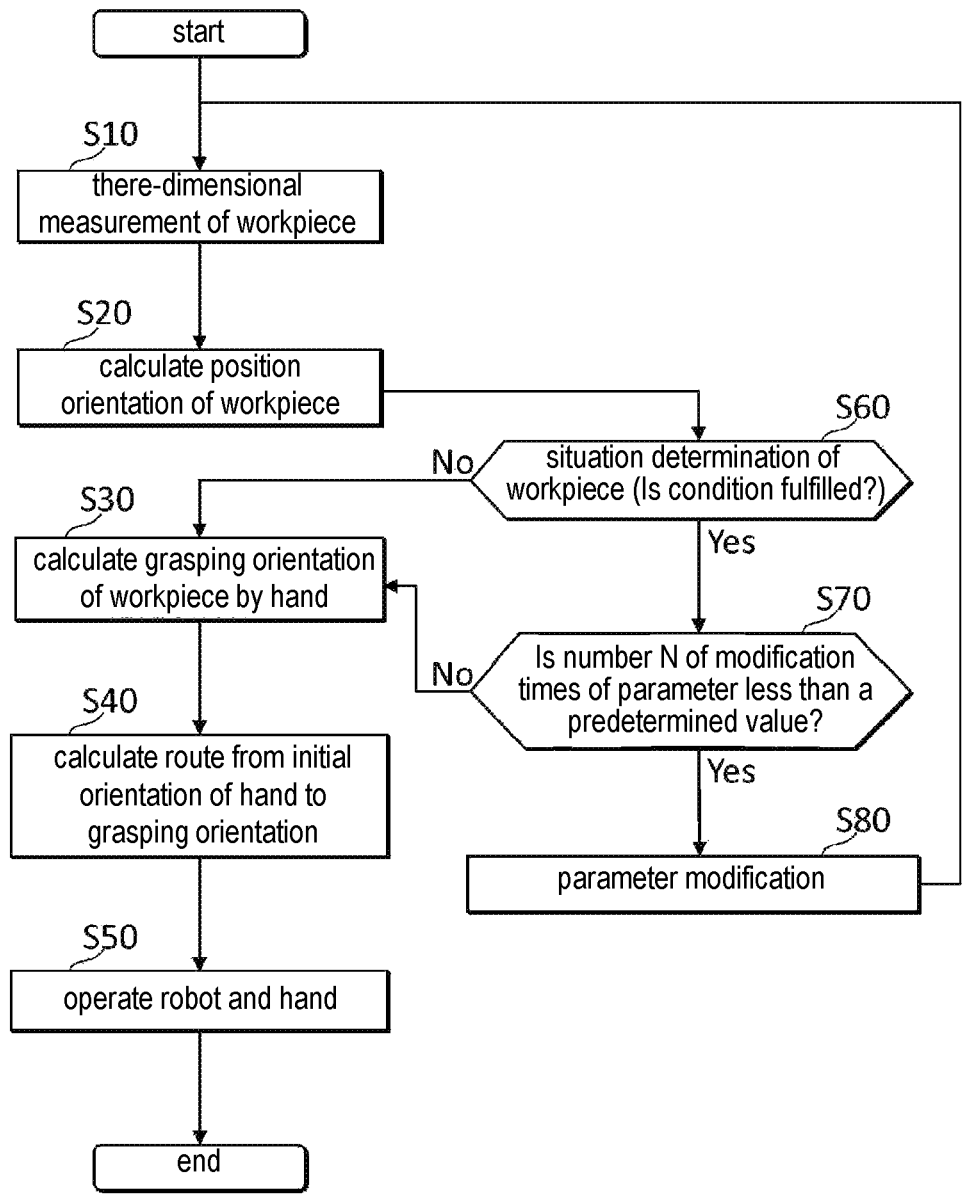
FIG. 4 is a flow chart showing an example of a processing procedure in the workpiece picking device according to the embodiment.

Next, an example of the operation of the workpiece picking device 100 is described with reference to FIG. 4. FIG. 4 is a flowchart showing an example of a processing procedure in the workpiece picking device 100 according to the present embodiment, and is also a flowchart showing an example of a processing procedure in a workpiece picking method in which the workpiece picking device 100 is used. Moreover, the processing procedure described below is merely an example, and each processing may be modified as much as possible within the scope of the technical idea of the present disclosure. In addition, in the processing procedure described below, steps can be omitted, replaced, and added as appropriate depending on the embodiment and each configuration example.

(Startup)

First, the user of the workpiece picking device 100 starts up the workpiece picking device 100 and executes various programs (calculation program, control program, etc.). Then, the control calculation part 41 of the control device 4 controls the operation of each of the sensor 1, the hand 2, and the robot 3 according to the following processing procedure, and performs the calculation processing by each functional part in the control device 4. In addition, in the present embodiment, prior to the processing in each of the following steps, initial value sets of measurement parameters and various calculation parameters required in each step are read from the storage part 43 and are appropriately held in the sensor control part 470, the position orientation calculation part 410, the grasping orientation calculation part 420, and the route calculation part 430. However, the reading of the parameters may also be performed at an appropriate timing before the processing of each step.

As shown in FIG. 4, in the present embodiment, branching steps (steps S60 to S80) are executed in a series of processing, but for easy understanding, after the flow of processing from steps S10 to S50 is described in advance, the processing of steps S60 to S80 is described.

(Step S10)

In step S10, the sensor 1 is operated by the sensor control part 470, and the three-dimensional position of the workpiece 5 is measured using the initial value set of the measurement parameters. The measurement parameters include, for example, various parameters set in the measurement method to be applied, in addition to the exposure time, the illumination illuminance, and the measurement position (for example, the three-dimensional position or orientation (the direction of the optical axis) of the sensor 1 relative to the workpiece 5). Then, the sensor 1 performs predetermined image processing on the captured image of the workpiece 5 and outputs, for example, three-dimensional point group data (point group data) representing the three-dimensional position of the workpiece 5 and two-dimensional images corresponding to the three-dimensional point group data as a measurement result to the control device 4.

(Step S20)

In step S20, the position orientation calculation part 410 calculates the position and orientation of the workpiece 5 using the initial value set of the calculation parameters of the positions and orientations of the workpiece 5, and further calculates the number of the workpieces 5 (the workpiece number K) in which the position and the orientation are detected. The calculation parameters of the positions and orientations of the workpiece 5 may include, for example, a threshold value related to the detection of the workpiece 5 in the position orientation calculation, and more specifically, a threshold value of the three-dimensional matching when collating the measurement result of the workpiece 5 with a three-dimensional CAD model of the workpiece 5, an area of a segmentation in segmentation processing, and the like. Then, the position orientation calculation part 410 outputs, for example, the three-dimensional coordinates (x, y, z) and rotation angles (rx, ry, rz) about the three-dimensional axis for each workpiece 5 as the calculation result, and further outputs the workpiece number K.

(Step S30)

In step S30, the grasping orientation calculation part 420 calculates the grasping orientation of the workpiece 5 by the hand 2, using the initial value set of the calculation parameters of the grasping orientation of the hand 2 when the hand 2 grasps the workpiece 5 and on the basis of the position and orientation of the workpiece 5 calculated in step S20. The calculation parameters of the grasping orientation of the workpiece 5 by the hand 2 may include, for example, a threshold value or the like in the grasping orientation calculation.

(Step S40)

In step S40, the route calculation part 430 calculates, using the initial value set of the calculation parameters of the route of the hand 2 moving from the initial orientation to the grasping orientation, the route of moving the hand 2 from the initial orientation to the grasping orientation calculated in step S30. The calculation parameters for the route of the hand 2 moving from the initial orientation to the grasping orientation may include, for example, a threshold value of interference determination of the hand 2 with respect to the workpiece 5 or the storage container 6.

(Step S50)

Then, in step S50, the workpiece 5 being the grasping target (for example, the workpiece 5 having a high probability of being grasped is selected in order) is determined, and the robot control part 490 operates the robot 3 on the basis of the route to the target workpiece 5 calculated in step S40 to move the hand 2 to the grasping orientation of the workpiece 5 calculated in step S30. Then, the hand control part 480 operates the hand 2 on the basis of the grasping orientation to grasp the target workpiece 5. Furthermore, the robot control part 490 and the hand control part 480 take out the grasped workpiece 5 from the storage container 6, transfer it to an appropriate tray or the like, align and place the workpiece 5 thereon.

(Step S60)

As described above, in the present embodiment, after step S20 (position orientation calculation of workpiece) and before step S30 is performed, the processing shifts to step S60, and the situation determination of the workpiece 5 is performed in step S60.

Here, first, as a pre-processing of the situation determination of the workpiece 5, the region extraction part 440 extracts, using the three-dimensional point group data that is output from the sensor 1 and represents the three-dimensional position of the workpiece 5, a region (a defective region) in which missing or omission of data occurs. More specifically, when missing or omission occurs in the three-dimensional point group data, the measured value is generally the value "0" or integer values outside the measurement range (the values can be called abnormal values). Therefore, labeling processing focusing on such abnormal values (processing of setting the same abnormal value to the same label) is performed on the three-dimensional point group data, and the part of the label corresponding to the abnormal value is extracted as the defective region. As described above, the region extraction part 440 in the present embodiment corresponds to the "defective region extraction part" in the present invention.

Next, the situation determination part 450 determines, for example, whether Condition 1 and Condition 2 shown below are satisfied, as the situation determination of the workpiece 5.

[Condition 1]: Whether the workpiece number K is equal to or less than a predetermined value.

[Condition 2]: Whether the area S or the volume V of the defective region is equal to or larger than a predetermined value.

A method for calculating the "area S of the defective region" is not particularly limited. For example, when a single defective region is extracted, in the three-dimensional point group data that is output from the sensor 1 or the two-dimensional image corresponding to the three-dimensional point group data, the two-dimensional coordinates indicating the peripheral edge of the defective region are specified, and the area calculated from the two-dimensional coordinates can be defined as the "area S of the defective region". In addition, for example, when a plurality of defective regions is extracted, in the three-dimensional point group data that is output from the sensor 1 or the two-dimensional image corresponding to the three-dimensional point group data, the two-dimensional coordinates indicating the peripheral edge of each defective region are specified, the area of each defective region is calculated from the two-dimensional coordinates, and a value obtained by summing the areas of all the obtained defective regions can be defined as the "area S of the defective region".

On the other hand, a method for calculating the "volume V of the defective region" is not particularly limited. For example, when a single defective region is extracted, in the three-dimensional point group data that is output from the sensor 1, the three-dimensional coordinates indicating the peripheral edge of the defective region are specified, and the volume calculated from the three-dimensional coordinates can be defined as the "volume V of the defective region". In addition, for example, when a plurality of defective regions is extracted, in the three-dimensional point group data that is output from the sensor 1, three-dimensional coordinates indicating the peripheral edge of each defective region are specified, the volume of each defective region is calculated from the three-dimensional coordinates, and a value obtained by summing the volumes of all the obtained defective regions can be defined as the "volume V of the defective region".

Here, regarding Condition 1, as the predetermined value of the workpiece number, for example, 0 to several pieces can be set in consideration of a state in which picking of the workpieces 5 advances to some extent and the number of remaining workpieces 5 decreases. Although it is assumed that a certain number of workpieces 5 remains, if the detected workpiece number K is extremely small, such as 0 or several workpieces, it is inferred that there is a high possibility of occurrence of a measurement abnormality.

In addition, regarding Condition 2, as the predetermined values of the area S and the volume V of the defective region, it is possible to set a value obtained by multiplying, by a predetermined ratio, the area of a bottom surface of the storage container 6 and the volume of the storage container 6 which are input in advance by the user. If the area S or the volume V of the defective region occupies a large proportion to some extent compared with the area of the bottom surface of the storage container 6 of the workpiece 5 and the volume of the storage container 6, it is inferred that there is a high possibility of occurrence of a measurement abnormality.

Therefore, when Condition 1 or Condition 2 mentioned above is satisfied, the actually remaining workpieces 5 are reliably detected by modifying the measurement parameter to perform retrying, and as a result, it is possible to enhance the possibility of grasping the workpiece 5 (a success rate of grasping). In addition, when both Condition 1 and Condition 2 are satisfied, if the measurement parameter is modified and the retrying is performed, it is possible to further enhance the success rate of grasping the workpiece 5.

Therefore, in the present embodiment, when Condition 1 is satisfied and Condition 2 is satisfied (when both Condition 1 and Condition 2 are "True"), the situation determination part 450 outputs "Yes (parameter modification is required)" as the determination result, and outputs position information of the defective region. On the other hand, when Condition 1 is not satisfied or Condition 2 is not satisfied (when either Condition 1 or Condition 2 is "False"), the situation determination part 450 outputs "No (parameter modification is not required)" as the determination result.

(Step S70)

When the situation determination result of the workpiece satisfies Condition 1 and Condition 2 in step S60 ("Yes" in step S60), the processing shifts to step S70, and the parameter modification part 460 determines whether the number N of modification times of parameter so far (a total value of the number of modification times of the measurement parameter and the number of modification times of the calculation parameter in the first to third configuration examples described later) is less than a predetermined value. As the predetermined value of the number of modification times of the parameter, because it is expected that the success rate of grasping the remaining workpiece 5 has already considerably increased at that time by modifying the parameter to a certain degree of times, it is possible to set a finite value of, for example, about five times to ten times.

(Step S80)

If the determination result of the number of modification times of the parameter satisfies the condition in step S70 ("Yes" in step S70), the processing shifts to step S80 to modify the parameter. In the present embodiment, among the measurement parameters and various calculation parameters, the measurement parameter in the measurement of the workpiece 5 performed by the sensor 1 is modified.

Here, first, as a pre-processing of the measurement parameter modification, the parameter modification part 460 determines whether "halation" or "black crushing" occurs in a part corresponding to the defective region in the captured image, on the basis of the position information of the defective region output from the situation determination part 450 and the two-dimensional image output from the sensor 1. Moreover, "halation" refers to a state in which the gradation of a too bright portion in an image is lost and the portion becomes a single white color, and "halation" is sometimes called "blurred white" or "halo". In addition, "black crushing" refers to a state in which information of the gradation of a bright portion in the image is not obtained and the portion is painted in black.

More specifically, if an average brightness value (usually represented in the range of 0 to 255) of the pixels corresponding to the defective region in the two-dimensional image is, for example, 128 or more, it is determined that "halation" occurs. If the average brightness value is less than 128, it is determined that "black crushing" occurs. Then, depending on the "halation" and the "black crushing", the parameter modification part 460 modifies the measurement parameters (for example, various parameters set in the applied measurement method in addition to the exposure time, the illumination illuminance, and the measurement position) and newly sets the measurement parameters, to the extent that an occurrence of "halation" and "black crushing" can be suppressed. More specifically, the parameter modification part 460 can modify the measurement parameter, for example, to make the exposure time shorter than the initial value in the case of "halation" and make the exposure time longer than the initial value in the case of "black crushing" (but not limited thereto).

Then, after modifying the measurement parameter in step S80, the processing returns to step S10, the sensor 1 re-measures the three-dimensional position of the workpiece 5 using the modified measurement parameter, and the subsequent processing steps are sequentially executed. In addition, the parameter modification part 460 increments the number N of modification times of parameter each time the parameter is modified.

On the other hand, when the situation determination result of the workpiece does not satisfy Condition 1 or Condition 2 in step S60 ("No" in step S60), or when the determination result of the number of modification times of parameter does not satisfy the condition in step S70 ("No" in step S70), the processing shifts to processing after step S30 and the processing ends, without modifying the parameters. In addition, when the situation determination result of the workpiece does not satisfy Condition 1 or Condition 2 in step S60 ("No" in step S60), the parameter modification part 460 resets the number N of modification times of parameter (N="0" is set).

§ 4 Operation and Effect

As described above, according to the example of the workpiece picking device 100 and the workpiece picking method according to the present embodiment, the sensor 1 temporarily measures, for example, the individual three-dimensional positions of the workpieces 5 stacked in the storage container 6, using the initial value set of the measurement parameters, calculates the position and orientation of the workpiece 5 and the detected workpiece number K on the basis of the measurement result, and the situation determination part 450 further performs the situation determination of the workpiece 5 on the basis of the above results. Then, for example, when the situation determination result of the workpiece 5 satisfies Condition 1 and Condition 2, the measurement parameter is reset, and the three-dimensional position of the workpiece 5 is re-measured by the sensor 1 using the reset measurement parameter, and then the picking processing of the workpiece 5 is sequentially executed. Therefore, even if missing or omission (a defective region) occurs in the initial measured value of the three-dimensional position of the workpiece 5, the picking operation of the workpiece suitable for the situation can be performed, and as a result, the success rate when grasping the workpiece 5 by the hand 2 can be significantly improved as compared with the conventional case (a failure rate can be significantly reduced).

In addition, after the actual situation of the workpiece 5 is grasped, it is determined whether the measurement parameter needs to be modified as necessary, without performing the processing of performing a plurality of measurements with a plurality of predetermined measurement parameters, then selecting good measurement results from a large number of measurement results, and picking a workpiece on the basis of the result thereof. Accordingly, it is possible to prevent an excessive increase in processing time.

§ 5 Modified Example

Although the embodiment as an example of the present disclosure has been described above in detail, it is evident that the aforementioned description merely shows an example of the present disclosure in every respect, and various improvements and modifications can be made without departing from the scope of the present disclosure. For example, it is possible to make the following modifications. Moreover, in the following description, the same constituent elements as those in the aforementioned embodiment are denoted by the same reference numerals, and description of the same points as those in the aforementioned embodiment will be omitted appropriately. In addition, the above-described embodiment and each of the following modified examples can be configured by being appropriately combined.

<5.1>

Figure 5:
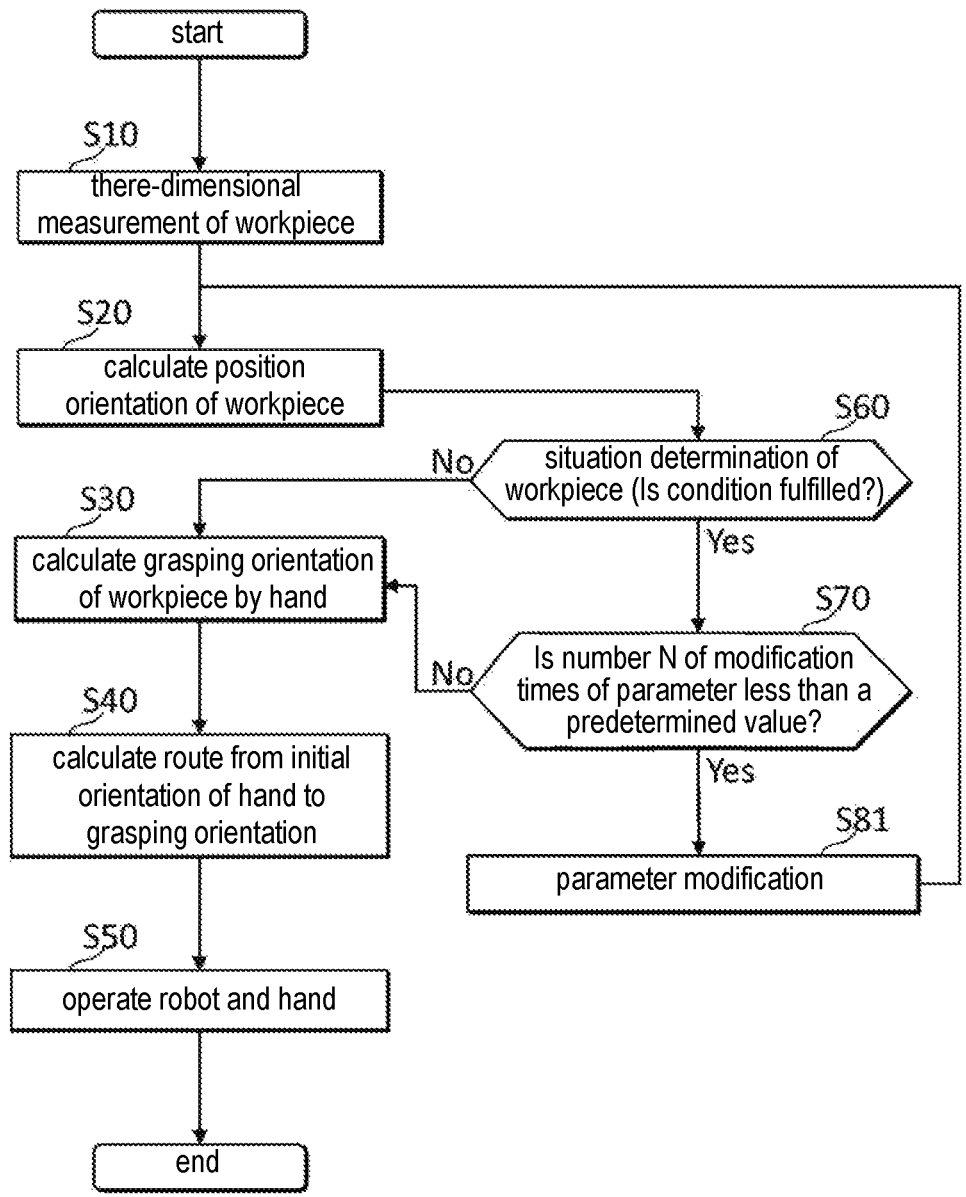
FIG. 5 is a flow chart showing an example of a processing procedure in the workpiece picking device according to a first configuration example as another embodiment.

FIG. 5 is a flowchart showing an example of a processing procedure in the workpiece picking device according to the first configuration example as another embodiment. In the first configuration example, the same processing as that in the embodiment shown in FIG. 4 is performed except that the parameter modification processing of step S81 is performed instead of the parameter modification processing of step S80 shown in the flowchart of FIG. 4, and except that after the parameter modification processing is performed, the processing returns to step S20, and the position orientation calculation part 410 calculates the position and orientation of the workpiece 5 using the modified calculation parameter.

That is, in the first configuration example, in step S81, the parameter modification part 460 modifies, as the calculation parameter of the position and orientation of the workpiece 5 among the measurement parameters and various calculation parameters, the threshold value relating to the detection of the workpiece 5 in the position orientation calculation, more specifically, the threshold value of the three-dimensional matching when collating the measurement result of the workpiece 5 with the three-dimensional CAD model of the workpiece 5, or the area of the segmentation in the segmentation processing by a predetermined ratio.

In addition, in this case, the "predetermined ratio" may be modified depending on the number N of modification times of parameter. For example, when the score of the three-dimensional matching is represented by a numerical value in the range of 0 to 100 and the initial threshold value is 80, the threshold value may be modified to be represented by a new threshold value=80−(N×10) (for example, in the case of N=1, a new threshold value=70 is obtained, and in the case of N=4, a new threshold value=40 is obtained). Moreover, the new threshold value may not be calculated by the aforementioned formula. A table of the threshold value corresponding to the number N of modification times of parameter may be held in the storage part 43 in advance, and the new threshold value may be appropriately read out when the parameter needs to be modified.

Then, after modifying the calculation parameter in step S81, the processing returns to step S20, the position orientation calculation part 410 re-calculates the position and orientation of the workpiece 5 using the modified calculation parameter, and the subsequent processing steps are sequentially executed.

Also in the first configuration example, when the situation determination result of the workpiece 5 satisfies, for example, Condition 1 and Condition 2, the calculation parameter of the position and orientation among the measurement parameters and various calculation parameters is reset, the position and orientation of the workpiece 5 are recalculated using the reset calculation parameter, and then the picking processing of the workpiece 5 is sequentially executed. Therefore, even if missing or omission (a defective region) occurs in the initial measured value of the three-dimensional position of the workpiece 5, a suitable picking operation of the workpiece corresponding to the situation can be performed, and as a result, the success rate when grasping the workpiece 5 by the hand 2 can be significantly improved (the failure rate can be reduced) as compared with before, and an increase in processing time can be suppressed.

<5.2>

Figure 6:
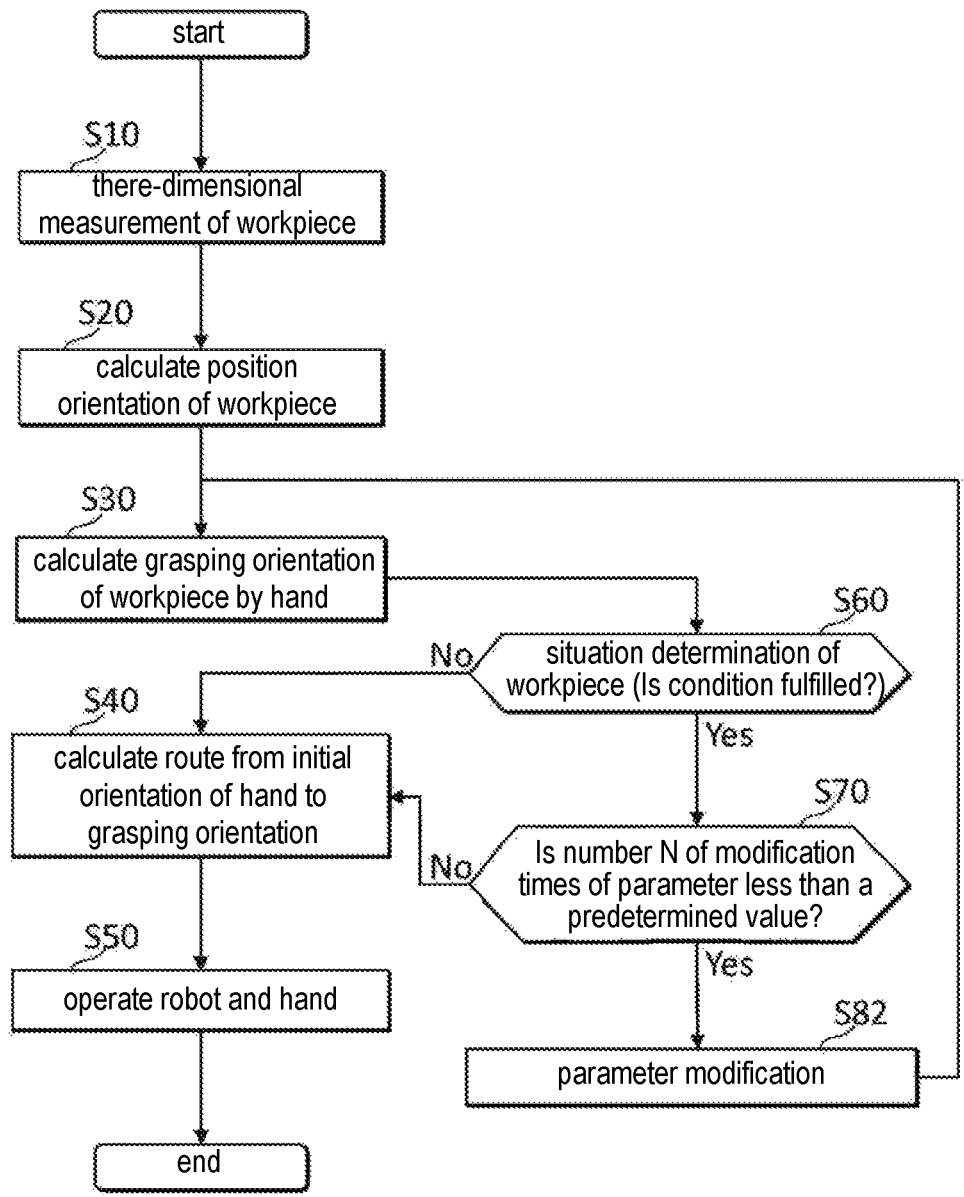
FIG. 6 is a flow chart showing an example of a processing procedure in the workpiece picking device according to a second configuration example as another embodiment.

FIG. 6 is a flowchart showing an example of a processing procedure in a workpiece picking device according to a second configuration example as another embodiment. The second configuration example is the same processing as that in the embodiment shown in FIG. 4, except that the parameter modification processing of step S82 is performed instead of the parameter modification processing in step S80 shown in the flowchart of FIG. 4, and except that after the parameter modification processing is performed, the processing returns to step S30, and the grasping orientation calculating part 420 calculates the grasping orientation of the workpiece 5 by the hand 2 using the modified calculation parameter.

That is, in the second configuration example, in step S82, the parameter modification part 460 modifies, as the calculation parameter of the grasping orientation of the workpiece 5 by the hand 2 among the measurement parameters and various calculation parameters, the threshold value in the grasping orientation calculation by a predetermined ratio. In addition, in this case, as in the first configuration example, the "predetermined ratio" may be modified depending on the number N of modification times of parameter. In addition, as in the first configuration example, the new threshold value may not be calculated. A table of threshold values according to the number N of modification times of parameter is held in the storage part 43 in advance, and the new threshold value may be appropriately read out when the parameter needs to be modified.

Then, after modifying the calculation parameter in step S82, the processing returns to step S30, the grasping orientation calculation part 420 recalculates the grasping orientation of the workpiece 5 by the hand 2 using the modified calculation parameter, and the subsequent processing steps are sequentially executed.

Also in the second configuration example, when the situation determination result of the workpiece 5 satisfies, for example, Condition 1 and Condition 2, the calculation parameter of the grasping orientation among the measurement parameters and various calculation parameters is reset, the grasping orientation of the workpiece 5 by the hand 2 is recalculated using the reset calculation parameter, and then the picking process of the workpiece 5 is sequentially executed. Therefore, even if missing or omission (a defective region) occurs in the initial measured value of the three-dimensional position of the workpiece 5, a suitable picking operation of the workpiece corresponding to the situation can be performed, and as a result, the success rate when grasping the workpiece 5 by the hand 2 can be significantly improved as compared with before (the failure rate can be significantly reduced), and an increase in processing time can be suppressed.

<5.3>

Figure 7:
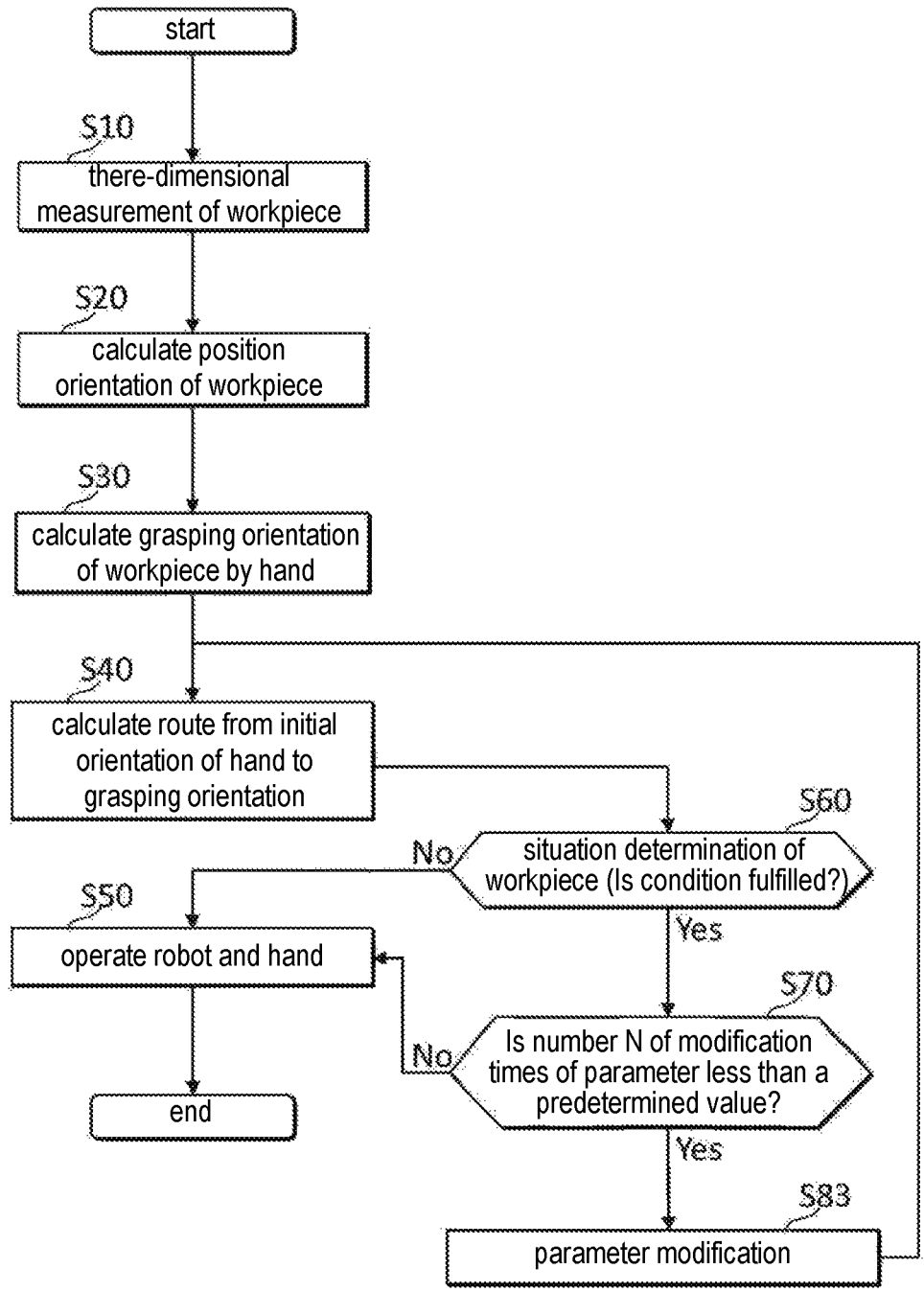
FIG. 7 is a flow chart showing an example of a processing procedure in the workpiece picking device according to a third configuration example as another example.

FIG. 7 is a flowchart showing an example of a processing procedure in a workpiece picking device according to a third configuration example as another embodiment. The third configuration example performs the same processing as that in the embodiment shown in FIG. 4 except that the parameter modification processing of step S83 is performed instead of the parameter modification processing in step S80 shown in the flowchart of FIG. 4, and except that after the parameter modification processing is performed, the processing returns to step S40, and the route calculation part 430 calculates, using the modified calculation parameter, the route that moves from the initial orientation of the hand 2 to the grasping orientation.

That is, in the third configuration example, in step S83, the parameter modification part 460 modifies, as the calculation parameter of the route moving from the initial orientation of the hand 2 to the grasping orientation among the measurement parameters and various calculation parameters, the threshold value of the interference determination of the hand 2 with respect to the workpiece 5 and the storage container 6 by a predetermined ratio. In addition, in this case, as in the first configuration example, the "predetermined ratio" may be modified depending on the number N of modification times of parameter. In addition, as in the first configuration example, the new threshold value may not be calculated. A table of threshold values according to the number N of modification times of parameter is held in the storage part 43 in advance, and the new threshold value may be appropriately read out when the parameter needs to be modified.

In addition, after modifying the calculation parameter in step S83, the processing returns to step S40, the route calculation part 430 recalculates, using the modified calculation parameter, the route from the initial orientation of the hand 2 to the grasping orientation, and the subsequent processing steps are sequentially executed.

Also in the third configuration example, when the situation determination result of the workpiece 5 satisfies, for example, Condition 1 and Condition 2, the calculation parameter of the route moving from the initial orientation of the hand 2 to the grasping orientation among the measurement parameters and various calculation parameters is reset, the route moving from the initial orientation of the hand 2 to the grasping orientation is recalculated using the reset calculation parameter, and then the picking processing of the workpiece 5 is sequentially executed. Therefore, even if missing or omission (a defective region) occurs in the initial measured value of the three-dimensional position of the workpiece 5, a suitable picking operation of the workpiece corresponding to the situation can be performed, and as a result, the success rate when grasping the workpiece 5 by the hand 2 can be significantly improved as compared with before (the failure rate can be significantly reduced), and an increase in processing time can be suppressed.

<5.4>

In addition, in the processing of the above-described embodiment and the first to third configuration examples, as an example, the determination method based on whether Condition 1 and Condition 2 are satisfied has been described as the situation determination of the workpiece 5. However, Condition 1+Condition 3 described later may be applied as the determination condition instead of Condition 1+Condition 2 (whether the area S or the volume V of the defective region is equal to or greater than a predetermined value).

[Condition 3]: Whether the position of the defective region exists within a predetermined range in the storage container 6 of the workpiece 5.

Here, regarding Condition 3, for example, a region near the wall of the storage container 6 or a region near a corner in the case of a rectangular container may be specified as the predetermined range, on the basis of the shape data of the storage container 6 which has been previously input by the user. In general, when the workpiece 5 exists near the wall of the storage container 6 or near the corners, because missing or omission is likely to occur in the measured values of the three-dimensional position, or the grasping tends to be relatively difficult, the change in parameter is effective even when the defective region is in the predetermined range.

That is, here, when Condition 1 and Condition 3 are satisfied (when both Condition 1 and Condition 3 are "True"), the situation determination part 450 outputs "Yes (parameter modification is required)" as the determination result, and outputs the position information of the defective region. On the other hand, when Condition 1 or Condition 3 is not satisfied (when either Condition 1 or Condition 3 is "False"), the situation determination part 450 outputs "No (parameter modification is not required)" as the determination result.

<5.5>

In addition, in the processing of the above-described embodiment and the first to third configuration examples, as an example, the determination method has been described in which the region extraction part 440 extracts a defective region from the three-dimensional point group data, and Condition 2 which is the determination condition based on the feature amount (the area S or the volume V) of the defective region is applied. However, for example, the region extraction part 440 may extract a planar region instead of a defective region from the three-dimensional point group data, and determination condition based on a feature amount of the planar region may be applied. That is, here, as the situation determination processing, the situation of the workpiece 5 is determined on the basis of the number of workpieces 5 in which positions and orientations are detected (the workpiece number), and the planar region extracted from the three-dimensional point group data as the measurement result of the three-dimensional position of the workpiece 5. The "planar region" is a region recognized as a "plane" in the measured value of the three-dimensional positions of the workpieces 5 (for example, three-dimensional point group data that represents the three-dimensional position of the workpiece 5), and more specifically, a region corresponding to, for example, the bottom surface of the storage container 6 of the workpiece 5 or the surface of the support table on which the workpieces 5 are stacked.

In this case, in step S60, first, as a pre-processing of the situation determination of the workpiece 5, the region extraction part 440 extracts the planar region using the three-dimensional point group data that is output from the sensor 1 and represents the three-dimensional position of the workpiece 5. As described above, the region extraction part 440 of the present embodiment corresponds to the "planar region extraction part" in the present invention.

Next, the situation determination part 450 determines, for example, whether Condition 1 and Condition 4 or Condition 5 shown below are satisfied, as the situation determination of the workpiece 5.

[Condition 1]: Whether the workpiece number K is equal to or less than a predetermined value.

[Condition 4]: Whether the distance D or the area S of the planar region is equal to or less than a predetermined value.

[Condition 5]: Whether the position of the planar region is within a predetermined range with respect to a placement surface of the workpiece 5 (here, the bottom surface of the storage container 6).

Moreover, the method for calculating the "distance D of the planar region" is not particularly limited. For example, when a single planar region is extracted, in the three-dimensional point group data that is output from the sensor 1 or a two-dimensional image corresponding to the three-dimensional point group data, a plane including the planar region is specified, and a distance between an arbitrary distance reference point and the specified surface, that is, a length of a perpendicular line from the distance reference point to the specified surface can be set as the "distance D of the planar region". In addition, for example, when a plurality of planar regions is extracted, in the three-dimensional point group data that is output from the sensor 1 or the two-dimensional image corresponding to the three-dimensional point group data, a plane including each planar region is specified, and a distance between an arbitrary distance reference point and each of the specified surfaces, that is, a length of a perpendicular line from the distance reference point to each of the specified surfaces can be set as the "distance D of the planar region".

On the other hand, the method of calculating the "area S of the planar region" is not particularly limited either. For example, when a single planar region is extracted, in the three-dimensional point group data that is output from the sensor 1 or the two-dimensional image corresponding to the three-dimensional point group data, the two-dimensional coordinates indicating the peripheral edge of the planar region are specified, and the area calculated from the two-dimensional coordinates can be set as the "area S of the planar region". In addition, for example, when a plurality of planar regions is extracted, the two-dimensional coordinates indicating the peripheral edges of each planar region are specified in the three-dimensional point group data that is output from the sensor 1 or the two-dimensional image corresponding to the three-dimensional point group data, the area of each planar region is calculated from the two-dimensional coordinates, and the value obtained by adding up the areas of all the obtained planar regions can be set as the "area S of the planar region".

Here, regarding Condition 4, as the predetermined value of the distance D of the planar region, for example, it is possible to set a value obtained by multiplying, by a predetermined ratio, a distance from an arbitrary distance reference point to the bottom surface of the storage container 6 that is previously input by the user (a length of the perpendicular line from the distance reference point to the bottom surface). In addition, as the predetermined value of the area S of the planar region, it is possible to set a value obtained by multiplying, by a predetermined ratio, the area of the bottom surface of the storage container 6 that is previously input by the user. When the distance D of the planar region is greater than the predetermined value or when the area S of the planar region is greater than the predetermined value, the extracted planar region is highly likely to be the bottom surface of the storage container 6. However, when the distance D of the planar region is equal to or less than the predetermined value, or when the area S of the planar region is equal to or less than the predetermined value, the planar region is unlikely to be the bottom surface of the storage container 6. Accordingly, in this case, it is inferred that the workpiece 5 is highly likely to remain in the storage container 6.

In addition, regarding Condition 5, for example, the region near the wall other than the center of the storage container 6 or the region near the corner in the case of a rectangular container can be specified as the predetermined range, on the basis of the shape data of the storage container 6 that is previously input by the user. In general, when a planar region exists in the central region of the storage container 6, the extracted planar region is highly likely to correspond to the bottom surface of the storage container 6. However, when the planar region is at a position other than the center, because the planar region is unlikely to be the bottom surface of the storage container 6, in that case, it is inferred that the workpiece 5 is highly likely to remain in the storage container 6.

Therefore, as the determination condition of this case, for example, when Condition 1 is satisfied and either Condition 4 or Condition 5 is satisfied (Condition 1 is "True" and either Condition 4 or Condition 5 is "True"), the condition 5 outputs "Yes (parameter modification is required)" as the determination result, and outputs the position information of the planar region. Moreover, in a case that a plurality of planar regions is extracted, when, for example, any of the plurality of "distances D of planar regions" satisfies Condition 4 (any of the plurality of planar regions does not correspond to the bottom surface of the storage container 6), Condition 4 can be set to "True".

On the other hand, when Condition 1 is not satisfied or neither Condition 4 nor Condition 5 is satisfied (when Condition 1 is "False" or both Condition 4 and Condition 5 are "False"), the situation determination part 450 outputs "No (parameter modification is not required)" as the determination result. Moreover, in a case that a plurality of planar regions is extracted, when, for example, none of the plurality of "distances D of the planar regions" satisfies Condition 4 (any of the plurality of planar regions corresponds to the bottom surface of the storage container 6), Condition 4 can be set to "False".

Furthermore, when the parameter needs to be modified in step S60 ("Yes" in step S60) and the determination result of the number of modification times of the parameter satisfies the condition in step S70 ("Yes" in step S70), the following processing is performed as a pre-processing of the parameter modification in step S80. That is, the parameter modification part 460 obtains an average brightness value of the part of the region other than the planar region in the captured image, on the basis of the position information of the region other than the planar region output from the situation determination part 450 and the two-dimensional image output from the sensor 1. In addition, the exposure time which is a measurement parameter is modified in the same manner as in the embodiment shown in FIG. 4 on the basis of the result of the average brightness value.

§ 6 APPENDIX

The embodiments described above are intended to facilitate the understanding of the present invention but not to interpret the present invention in a limiting manner. Each element included in the embodiment, its arrangement, material, condition, shape, size and the like are not limited to the exemplified ones and can be modified as appropriate. In addition, the configurations shown in different embodiments can be partially replaced or combined.

(Appendix 1)

A workpiece picking device (100) for taking out stacked workpieces (5), including:

a sensor (1) configured to measure three-dimensional positions of the workpieces (5);

a hand (2) configured to grasp the workpieces (5);

a robot (3) configured to move the hand (2) to and from a grasping position; and a control device (4) configured to control the sensor (1), the hand (2), and the robot (3); in which the control device (4) includes:

a position orientation calculation part (410) configured to calculate, on the basis of measurement results of the three-dimensional positions and using a predetermined calculation parameter, positions and orientations of the workpieces (5), and calculate the workpiece number in which positions and orientations are detected;

a grasping orientation calculation part (420) configured to calculate, on the basis of the calculation results of the positions and orientations and using a predetermined calculation parameter, a grasping orientation of the hand (2) when the hand (2) grasps the workpieces (5);

a route calculation part (430) configured to calculate, using a predetermined calculation parameter, a route through which the hand (2) moves to the grasping orientation;

a sensor control part (470) configured to control the operation of the sensor (1) on the basis of measurement parameters when measuring the three-dimensional positions;

a hand control part (480) configured to control the operation of the hand (2) on the basis of the grasping orientation;

a robot control part (490) configured to control the operation of the robot (3) on the basis of the route;

a situation determination part (450)) configured to determine situations of the workpieces (5) on the basis of the measurement results of the three-dimensional positions and the calculation results of the workpiece number; and a parameter modification part (460) configured to modify a parameter including at least one of a measurement parameter when measuring the three-dimensional positions, a calculation parameter of the positions and orientations, a calculation parameter of the grasping orientation, and a calculation parameter of the route, when the determination results of situations of the workpieces (5) satisfy a predetermined condition.

(Appendix 2)

The workpiece picking device (100) according to appendix 1, in which the control device (4) includes a defective region extraction part (440) which extracts a defective region from the measurement results of the three-dimensional positions, and the situation determination part (450) determines the situations of the workpieces (5) on the basis of the workpiece number and a position, an area or a volume of the defective region.

(Appendix 3)

The workpiece picking device (100) according to appendix 1, in which the control device (4) includes a planar region extraction part (440) which extracts a planar region from the measurement results of the three-dimensional positions, and the situation determination part (450) determines the situations of the workpieces (5) on the basis of the workpiece number and a position, a distance or an area of the planar region.

(Appendix 4)

The workpiece picking device (100) according to any one of appendices 1 to 3, in which the parameter modification part (460) modifies the parameter when the workpiece number is equal to or less than a predetermined value.

(Appendix 5)

The workpiece picking device (100) according to appendix 2 or 4, in which the parameter modification part (460) modifies the parameter when the area or volume of the defective region is equal to or greater than a predetermined value or when the position of the defective region exists in a predetermined range within a placement region of the workpiece (5).

(Appendix 6)

The workpiece picking device (100) according to appendix 3 or 4, in which the parameter modification part (460) modifies the parameter when the distance or area of the planar region is equal to or less than a predetermined value or when the position of the planar region exists in a predetermined range with respect to a placement surface of the workpiece (5).

(Appendix 7)

The workpiece picking device (100) according to any one of appendices 1 to 6, in which the parameter modification part (460) limits the modification of the parameter within a predetermined number of times.

(Appendix 8)

The workpiece picking device (100) according to any one of appendices 1 to 7, in which the parameter modification part (460) modifies at least one of an exposure time, an illumination illuminance, and a measurement position as measurement parameters when measuring the three-dimensional positions.

(Appendix 9)

The workpiece picking device (100) according to appendix 8, in which the parameter modification part (460) modifies at least one of the exposure time, the illumination illuminance, and the measurement position on the basis of brightness of the defective region.

(Appendix 10)

The workpiece picking device (100) according to any one of appendices 1 to 7, in which the parameter modification part (460) modifies a threshold value of the position orientation calculation as a calculation parameter of the position and orientation.

(Appendix 11)

The workpiece picking device (100) according to any one of appendices 1 to 7, in which the parameter modification part (460) modifies a threshold value of the grasping orientation calculation as a calculation parameter of the grasping orientation.

(Appendix 12)

The workpiece picking device (100) according to any one of appendices 1 to 7, in which the parameter modification part (460) modifies a threshold value of interference determination as a calculation parameter of the route.

(Appendix 13)

The workpiece picking device (100) according to any one of appendices 1 to 12, in which the parameter modification part (460) modifies the parameter depending on the number of modification times of the parameter.

(Appendix 14)

A workpiece picking method for taking out stacked workpieces (5) by using a workpiece picking device (100) including a sensor (1), a hand (2), a robot (3), and a control device (4), the method including:

a measuring step in which the sensor (1) measures three-dimensional positions of the workpieces (5);

a grasping step in which the hand (2) grasps the workpieces (5);

a moving step in which the robot (3) moves the hand (2) to and from a grasping position; and a controlling step in which the control device (4) controls the sensor (1), the hand (2), and the robot (3);

in which the controlling step includes:

a position orientation calculating step of calculating, on the basis of measurement results of the three-dimensional positions and using a predetermined calculation parameter, positions and orientations of the workpieces (5), and calculating the workpiece number in which positions and orientations are detected;

a grasping orientation calculating step of calculating, on the basis of the calculation results of the positions and orientations and using a predetermined calculation parameter, a grasping orientation of the hand (2) when the hand (2) grasps the workpieces (5);

a route calculating step of calculating, using a predetermined calculation parameter, a route through which the hand (2) moves to the grasping orientation;

a sensor controlling step of controlling the operation of the sensor (1) on the basis of measurement parameters when measuring the three-dimensional positions;

a hand controlling step of controlling the operation of the hand (2) on the basis of the grasping orientation;

a robot controlling step of controlling the operation of the robot (3) on the basis of the route;

a situation determining step of determining situations of the workpieces (5) on the basis of the measurement results of the three-dimensional positions and the calculation results of the workpiece number; and a parameter modifying step of modifying a parameter including at least one of a measurement parameter when measuring the three-dimensional positions, a calculation parameter of the positions and orientations, a calculation parameter of the grasping orientation, and a calculation parameter of the route, when the determination results of situations of the workpieces (5) satisfy a predetermined condition.

What is claimed is:

1. A workpiece picking device for taking out stacked workpieces, comprising:
   a sensor configured to measure three-dimensional positions of the workpieces;
   a hand configured to grasp the workpieces;
   a robot configured to move the hand to and from a grasping position; and
   a control device configured to control the sensor, the hand, and the robot;
   wherein the control device comprises:
   a processor, configured to:
   calculate, on the basis of measurement results of the three-dimensional positions and using a predetermined calculation parameter, positions and orientations of the workpieces, and calculate the workpiece number in which positions and orientations are detected;
   calculate, on the basis of the calculation results of the positions and orientations and using a predetermined calculation parameter, a grasping orientation of the hand when the hand grasps the workpieces;
   calculate, using a predetermined calculation parameter, a route through which the hand moves to the grasping orientation;
   control the operation of the sensor on the basis of measurement parameters when measuring the three-dimensional positions;
   control the operation of the hand on the basis of the grasping orientation;
   control the operation of the robot on the basis of the route;
   determine situations of the workpieces on the basis of the measurement results of the three-dimensional positions and the calculation results of the workpiece number; and
   modify a parameter including at least one of a measurement parameter when measuring the three-dimensional positions, a calculation parameter of the positions and orientations, a calculation parameter of the grasping orientation, and a calculation parameter of the route, when the determination results of situations of the workpieces satisfy a predetermined condition.

2. The workpiece picking device according to claim 1, wherein the processor extracts a defective region from the measurement results of the three-dimensional positions, and
   the processor determines the situations of the workpieces on the basis of the workpiece number and a position, an area or a volume of the defective region.

3. The workpiece picking device according to claim 1, wherein the processor extracts a planar region from the measurement results of the three-dimensional positions, and
   the processor determines the situations of the workpieces on the basis of the workpiece number and a position, a distance or an area of the planar region.

4. The workpiece picking device according claim 1, wherein the processor modifies the parameter when the workpiece number is equal to or less than a predetermined value.

5. The workpiece picking device according to claim 2, wherein the processor modifies the parameter when the area or volume of the defective region is equal to or greater than a predetermined value or when the position of the defective region exists in a predetermined range within a placement region of the workpiece.

6. The workpiece picking device according to claim 3, wherein the processor modifies the parameter when the distance or area of the planar region is equal to or less than a predetermined value or when the position of the planar region exists in a predetermined range with respect to a placement surface of the workpiece.

7. The workpiece picking device according to claim 1, wherein the processor limits the modification of the parameter within a predetermined number of times.

8. The workpiece picking device according to claim 1, wherein the processor modifies at least one of an exposure time, an illumination illuminance, and a measurement position as measurement parameters when measuring the three-dimensional positions.

9. The workpiece picking device according to claim 8, wherein the processor modifies at least one of the exposure time, the illumination illuminance, and the measurement position on the basis of brightness of a defective region.

10. The workpiece picking device according to claim 1, wherein the processor modifies a threshold value of the position orientation calculation as a calculation parameter of the position and orientation.

11. The workpiece picking device according to claim 1, wherein the processor modifies a threshold value of the grasping orientation calculation as a calculation parameter of the grasping orientation.

12. The workpiece picking device according to claim 1, wherein the processor modifies a threshold value of interference determination as a calculation parameter of the route.

13. The workpiece picking device according to claim 1, wherein the processor modifies the parameter depending on the number of modification times of the parameter.

14. A workpiece picking method for taking out stacked workpieces by using a workpiece picking device comprising a sensor, a hand, a robot, and a control device, the method comprising:
    a measuring step in which the sensor measures three-dimensional positions of the workpieces;
    a grasping step in which the hand grasps the workpieces;
    a moving step in which the robot moves the hand to and from a grasping position; and
    a controlling step in which the control device controls the sensor, the hand, and the robot;
    wherein the controlling step comprises:
    a position orientation calculating step of calculating, on the basis of measurement results of the three-dimensional positions and using a predetermined calculation parameter, positions and orientations of the workpieces, and calculating the workpiece number in which positions and orientations are detected;
    a grasping orientation calculating step of calculating, on the basis of the calculation results of the positions and orientations and using a predetermined calculation parameter, a grasping orientation of the hand when the hand grasps the workpieces;
    a route calculating step of calculating, using a predetermined calculation parameter, a route through which the hand moves to the grasping orientation;
    a sensor controlling step of controlling the operation of the sensor on the basis of measurement parameters when measuring the three-dimensional positions;
    a hand controlling step of controlling the operation of the hand on the basis of the grasping orientation;
    a robot controlling step of controlling the operation of the robot on the basis of the route;

a situation determining step of determining situations of the workpieces on the basis of the measurement results of the three-dimensional positions and the calculation results of the workpiece number; and a parameter modifying step of modifying a parameter including at least one of a measurement parameter when measuring the three-dimensional positions, a calculation parameter of the positions and orientations, a calculation parameter of the grasping orientation, and a calculation parameter of the route, when the determination results of situations of the workpieces satisfy a predetermined condition.

15. The workpiece picking device according claim 2, wherein the processor modifies the parameter when the workpiece number is equal to or less than a predetermined value.

16. The workpiece picking device according claim 3, wherein the processor modifies the parameter when the workpiece number is equal to or less than a predetermined value.

17. The workpiece picking device according to claim 4, wherein the processor modifies the parameter when the area or volume of a defective region is equal to or greater than a predetermined value or when the position of the defective region exists in a predetermined range within a placement region of the workpiece.

18. The workpiece picking device according to claim 4, wherein the processor modifies the parameter when the distance or area of the planar region is equal to or less than a predetermined value or when the position of the planar region exists in a predetermined range with respect to a placement surface of the workpiece.

19. The workpiece picking device according to claim 2, wherein the processor limits the modification of the parameter within a predetermined number of times.

20. The workpiece picking device according to claim 2, wherein the processor modifies at least one of an exposure time, an illumination illuminance, and a measurement position as measurement parameters when measuring the three-dimensional positions.

* * * * *